US008966655B2

(12) United States Patent
Womack et al.

(10) Patent No.: US 8,966,655 B2
(45) Date of Patent: Feb. 24, 2015

(54) ELECTRONIC LICENSE MANAGEMENT (75) Inventors: Mark D. Womack, San Jose, CA (US); Devesh Parekh, Mountain View, CA (US); Richard G. Cannings, Santa Cruz, CA (US); Dianne K. Hackborn, Santa Clara, CA (US); Sanjay Jeyakumar, Fremont, CA (US); Jasper Lin, Monterey Park, CA (US); Karl Rosaen, Ann Arbor, MI (US)

(73) Assignee: Google Inc., Mountain View, CA (US)

( * ) Notice: Subject to any disclaimer, the term of this patent is extended or adjusted under 35 U.S.C. 154(b) by 31 days.

(21) Appl. No.: 13/248,804

(22) Filed: Sep. 29, 2011

(65) Prior Publication Data
US 2012/0023596 A1    Jan. 26, 2012

Related U.S. Application Data (63) Continuation of application No. 13/111,877, filed on May 19, 2011, now abandoned.

(60) Provisional application No. 61/346,452, filed on May 19, 2010.

(51) Int. Cl.
*G06F 21/00* (2013.01)
*G06F 21/10* (2013.01)
(Continued)

(52) U.S. Cl.
CPC ............. *G06F 21/10* (2013.01); *G06F 21/121* (2013.01); *G06F 2221/0704* (2013.01); *G06Q 50/184* (2013.01)
USPC ........................................................ 726/29

(58) Field of Classification Search
USPC .................... 726/26, 28–30; 705/59
See application file for complete search history.

(56) References Cited

U.S. PATENT DOCUMENTS 5,790,664 A * 8/1998 Coley et al. .................. 709/203
8,402,555 B2   3/2013 Grecia
(Continued)

FOREIGN PATENT DOCUMENTS

EP      1 780 640        5/2007

OTHER PUBLICATIONS

International Search Report & Written Opinion for Application No. PCT/US2011/037258, dated Sep. 7, 2011, 12 pages.
(Continued)

*Primary Examiner* — Beemnet Dada
(74) *Attorney, Agent, or Firm* — Fish & Richardson P.C.

(57) ABSTRACT

In one aspect, this application describes a method for determining a license status of a software application. The method includes receiving a license status request to obtain an indication of whether a software application is licensed for use on a client computing device. The method also includes identifying identity information that corresponds to user identity information, device identity information, or both. The method also includes sending a communication generated from the license status request and the identity information to a licensing service, the communication being used by the licensing service to generate the indication based at least in part on the identity information and licensing information associated with the software application. The method also includes receiving a license status response from the licensing service that includes the indication. The method also includes sending the license status response to the software application for processing by the software application.

19 Claims, 6 Drawing Sheets (51) Int. Cl.
*G06F 21/12* (2013.01)
*G06Q 50/18* (2012.01)

(56) References Cited

U.S. PATENT DOCUMENTS

| | | |
|---|---|---|
| 8,533,860 B1 | 9/2013 | Grecia |
| 2004/0034786 A1 | 2/2004 | Okamoto et al. |
| 2006/0064387 A1* | 3/2006 | Jose et al. .................. 705/59 |
| 2007/0112684 A1* | 5/2007 | Coley et al. ............... 705/59 |
| 2008/0209569 A1* | 8/2008 | Araki ......................... 726/26 |
| 2008/0285758 A1* | 11/2008 | Chuprov et al. ........... 380/278 |
| 2009/0326964 A1 | 12/2009 | Garg et al. |
| 2010/0185868 A1 | 7/2010 | Grecia |
| 2011/0197077 A1* | 8/2011 | Chan et al. ................ 713/189 |
| 2011/0265157 A1 | 10/2011 | Ryder |

OTHER PUBLICATIONS

International Preliminary Report on Patentability in International Application No. PCT/US2011/037258, mailed Nov. 29, 2012, 8 pages.

Amazon Web Services, "STR3EM Digital Distribution System," Internet Publication: http://aws.amazon.com/customerapps/2621 [Publication date: Jun. 22, 2009], 3 pages.

CNET Download.com, "STR3EM Windows Software (in Java and C++ Publication)," Internet Publication: http://download.cnet.com/STR3EM/3010-13632_410976652.html?tag=metaData;specsBox, (Copublished on www.str3em.com) [Publication date: Dec. 9, 2009], 1 page.

\* cited by examiner

| Code | Name | Description |
|---|---|---|
| 0x101 | ERROR_CONTACTING_SERVER | The license server is unreachable. The client should retry later. |
| 0x102 | ERROR_INVALID_PACKAGE_NAME | The application requested license information for a package that isn't installed. This is a developer error, and they should fix their code. (Do not retry). |
| 0x103 | ERROR_NON_MATCHING_UID | The application requested license information for a package that has a different UID from that of the application performing the request. This is a developer error, and they should fix their code. (Do not retry). |

500

| Code | Name | Description |
|---|---|---|
| 0x0 | LICENSED | The user has purchased this paid application, or this is a free application.<br><br>The response-specific data has three optional fields (e.g. VT=1>=2&GR=3):<br><br>• VT: the timestamp that the client should consider the response valid until.<br>• GT: the timestamp that the client should ignore retry errors until.<br>• GR: the number of retry errors the client should ignore.<br>• B: an arbitrary string sent the developer wants to send with ever licensed request. Only sent for https requests. Sony uses this for returning a decryption key. |
| 0x1 | NOT_LICENSED | The user has not purchased this application. This will also be returned for hacking attempts (these heuristics should to be included in external documentation):<br><br>• The android id does not belong to a device owned by the user. |
| 0x2 | LICENSED_OLD_KEY | The application is purchased, but it has an update available signed with a different key. The fact that an upgrade is available that is signed with a different key might indicate that the key pair used by the current application is compromised. The developer might inform the user that an upgrade is available and allow them a limited number of runs of the current version.<br><br>The response-specific data is the same as LICENSED, with the addition of one more optional field.<br><br>• UT: the timestamp that an update was uploaded with a different key |
| 0x3 | ERROR_NOT_MARKET_MANAGED | The application requested license information for an application that Market does not know about. The response will not be signed. This is a developer error, and they should fix their code. (Do not retry.) |
| 0x4 | ERROR_INVALID_KEYS | The keys are invalid. The response will not be signed. The developer should generate new keys on the publisher site. (Do not retry.) This should not happen unless our DeveloperInfo table gets corrupted. |
| 0x5 | ERROR_OVER_QUOTA | The application has sent too many license requests from this device. The response will not be signed. |

ELECTRONIC LICENSE MANAGEMENT

CROSS-REFERENCE TO RELATED APPLICATION

This application claims is a continuation of U.S. application Ser. No. 13/111,877, filed May 19, 2011, entitled "Electronic License Management," which claims priority to U.S. Provisional Application No. 61/346,452, filed May 19, 2010, entitled "Multi-Party Electronic License Management," the entirety of which is incorporated herein by reference.

TECHNICAL FIELD

This application relates to managing access and rights to electronic media products such as software applications.

BACKGROUND

Software can be hard to create, but easy to copy. Creating a good software application can often take hundreds or thousands of hours, but a nefarious user with a basic computer can sometimes copy that same work product in seconds. Copyright law provides a measure of legal protection, but it cannot directly prevent unauthorized parties from making copies of a publisher's software. Therefore, in many cases, copyright protection alone may not be good enough.

Some software publishers have implemented technical hurdles to deter unauthorized copying of their software and other content—e.g., using copy protection schemes or various digital rights management (DRM) systems. One such example of a copy protection scheme is known as forward locking, which may be used, for example, to protect against unauthorized copying of software applications that third-parties may sell through an application store. Using the forward locking approach, a client device downloads requested software from the application store into a protected space on the device where the application binaries cannot be easily accessed by the user. Such an approach may involve duplicating non-executable resources, which for some applications (such as games) can extensively increase their installation size. Even more importantly, such an approach can, in certain instances, be overcome on devices, such as smart phones, that have been "unlocked" for development purposes, leaving the application binaries vulnerable to being copied off of the devices.

SUMMARY

This document describes systems and techniques for verifying a current license status of a software application or similar digital item. The license status of an application may be linked to a particular user or a particular device attempting to use the application, and may be used, in some cases, to control whether the particular user or device is allowed to continue using the application. For example, if a user has obtained the application through improper channels, e.g., by copying the application from a friend rather than purchasing it from the publisher, his or her license status may indicate that the user is not a licensed user. The application, in turn, may respond in an appropriate manner, such as by disabling certain functionality that is only available to licensed users.

In some implementations, the techniques described here may be used, for example, to protect software offered via an application market that is operated by a trusted organization. The trusted organization may also provide access to a licensing service for the software that is offered in the market. Any number of software publishers may offer their applications on the application market, and the applications may be purchased by, and distributed to, various users. In some instances, users wishing to access the application market may use a marketplace client that executes on the user's client device to browse or purchase the applications that are offered through the application market.

Software publishers who offer their software applications using such a system may want to prevent piracy of those applications. For example, although most of the copies of a publisher's application may be legitimately purchased, licensed, and distributed through the application market, other potentially unauthorized copies may also exist. As such, publishers may want a convenient way to distinguish between the legitimate licensed copies and the illegitimate unlicensed copies.

According to the techniques described here, an application executing on a client device may request the current license status of the application (e.g., whether a particular user and/or device is licensed to use the application) by querying a licensing server. The licensing server may respond with the license status (e.g., that the particular user, via one of their registered accounts, and/or the particular device is licensed or is not licensed to use the application), thus providing a distinction between legitimate copies and illegitimate copies of the application. The license checking techniques may be activated, for example, upon launch of the application, and further use of the application may be determined based on the result of the license check. In some implementations, if the license check indicates that the application is not properly licensed, the application may shut itself down or may provide only a limited subset of its overall functionality.

In one general aspect, this application describes a computer-implemented method for determining a license status of a software application. The method may include receiving, with a licensing client executing on a client computing device and from a software application executing on the client computing device, a license status request to obtain an indication of whether the software application is licensed for use on the client computing device. The method may also include identifying, using the licensing client, identity information that corresponds to at least one of the group consisting of user identity information that corresponds to a user of the client computing device and device identity information that corresponds to the client computing device. The method may also include sending a communication generated from the license status request and the identity information to a licensing service that operates remotely from the client computing device, the communication being used by the licensing service to generate the indication of whether the software application is licensed for use on the client computing device based at least in part on the identity information and licensing information associated with the software application. The method may also include receiving, with the licensing client, a license status response from the licensing service that includes the indication of whether the software application is licensed for use on the client computing device. The method may also include sending the license status response to the software application for processing by the software application.

In another general aspect, this application describes a computer-implemented system for obtaining a license status of a software application. The system may include a client computing device that is arranged to execute a software application and a licensing client. The system may also include a licensing server system that is arranged to execute a licensing service. The software application may be configured to generate a license status request to obtain from the licensing service an indication of whether the software application is licensed for use on the client computing device, and provide the license status request to the licensing client. The licensing client may be configured to receive the license status request from the software application, identify identity information that corresponds to at least one of the group consisting of user identity information that corresponds to a user of the client computing device and device identity information that corresponds to the client computing device, and send a communication generated from the license status request and the identity information to the licensing service. The licensing service may be configured to receive the communication from the licensing client, determine whether the software application is licensed for use on the client computing device based at least in part on the identity information and licensing information associated with the software application, generate a license status response that includes the indication of whether the software application is licensed for use on the client computing device, and send the license status response to the licensing client. The licensing client may further be configured to receive the license status response from the licensing service, and provide the license status response to the software application. The software application may further be configured to receive the license status response from the licensing client, and process the license status response.

In another general aspect, this application describes a computer-implemented method that may include receiving, with a licensing service executing on a licensing server system and from a licensing client executing on a client computing device that operates remotely from the licensing server system, a request to determine whether a software application executing on the client computing device is licensed for use on the client computing device. The request may include identity information that corresponds to at least one of the group consisting of user identity information and device identity information. The method may also include accessing licensing information that comprises purchase records associated with purchases of the software application through an application marketplace. The method may also include generating, based at least in part on the licensing information and the identity information, an indication of whether the software application is licensed for use on the client computing device. The method may also include sending the indication to the client computing device for processing by the client computing device.

In certain instances, various implementations may provide one or more of the following advantages. The licensing approach described here may be relatively easy for software publishers to implement, but may be relatively difficult for users to crack. As such, software publishers may be able to spend more time coding their applications to include the functionality for which the application is designed rather than developing application-specific copy protection schemes. Furthermore, the licensing approach may be flexible such that it allows software publishers to enforce configurable licensing policies in any manner they choose. In addition, the license checking functionality may not significantly increase the size of the application in certain implementations.

The details of one or more embodiments are set forth in the accompanying drawings and the description below. Other features and advantages will be apparent from the description and drawings, and from the claims.

DESCRIPTION OF DRAWINGS

FIG. 5 shows tables with example status codes that may be utilized by the license status checking systems and processes described herein.

Like reference symbols in the various drawings indicate like elements.

DETAILED DESCRIPTION

This document describes systems and techniques for protecting software applications that are distributed and sold through a central application store, or app store, against unauthorized uses of the application by unlicensed users and/or devices. The systems and techniques use a licensing scheme that checks the current license status of the application, e.g., by comparing information about the user or the device to a set of purchase records to identify whether the application has been properly licensed to the user and/or the device, and returns the license status of the application back to the application for appropriate handling. For example, when a license status check indicates that the current user is not licensed to use the application, the application may disable certain features that are only available to licensed users. In some cases, the licensing scheme described here may also be used to protect other digital content that is offered through the app store.

Such functionality may be provided by a single software distribution service that operates an app store for multiple different software publishers. The licensing system may publish guidelines for interacting with it so that individual publishers can obtain licensing protection fairly conveniently without having to establish their own verification systems and operate such systems. Rather, they can upload their applications in a fairly standard manner for presentation in an app store, and can have licensing restrictions implemented for them, and information about licensing issues reported to them.

Software publishers may upload their applications, or apps, to the app store along with appropriate metadata (e.g., pricing, a textual description, icons, an account number for receiving payments from users who download the application, etc.). Such publishers may wish to limit piracy of their apps using a combined legal and technological licensing approach. The technological aspect of the approach may exert restrictions over unlicensed use of the software, while the legal aspect of the approach may define corresponding rights to use the software in legal terms that are consistent with the technological limitations. The publishers may select from a menu of options for defining one or both of the technological and legal restrictions (e.g., by selecting from certain well-known and standard licensing systems, such as known open source licensing systems) and/or can fully define such restrictions themselves, such as by providing their own licensing language.

As described in greater detail below, a trusted licensing service may provide a secure way for publishers to control access to their applications by checking the license status of an application, e.g., before a user is allowed to run the application on a client device. When an application checks the license status at a licensing server, the licensing server may sign the license status response using a private key, which may be used to confirm that the license status response was in fact generated by the licensing server. The private key may be part of a public/private key pair that is uniquely associated with the application or with the publisher's account. The application may include the corresponding public key in its compiled binaries, and may use the public/private key pair to verify the integrity of the license status response.

To help publishers integrate licensing capabilities into an application, the trusted organization that operates or provides access to the licensing service (e.g., the same organization that runs the app store) may provide a code library that can be embedded into the application. The code library, described here as a License Verification Library (LVL), may handle the licensing-related communications with a marketplace client that operates on the user's client device, and the marketplace client may in turn communicate with the licensing service that operates on a remote licensing server. Using the embedded LVL, the application can determine its current license status by calling a license checker method and implementing a callback that receives the license status in a signed response from the remote licensing server.

Figure 1:
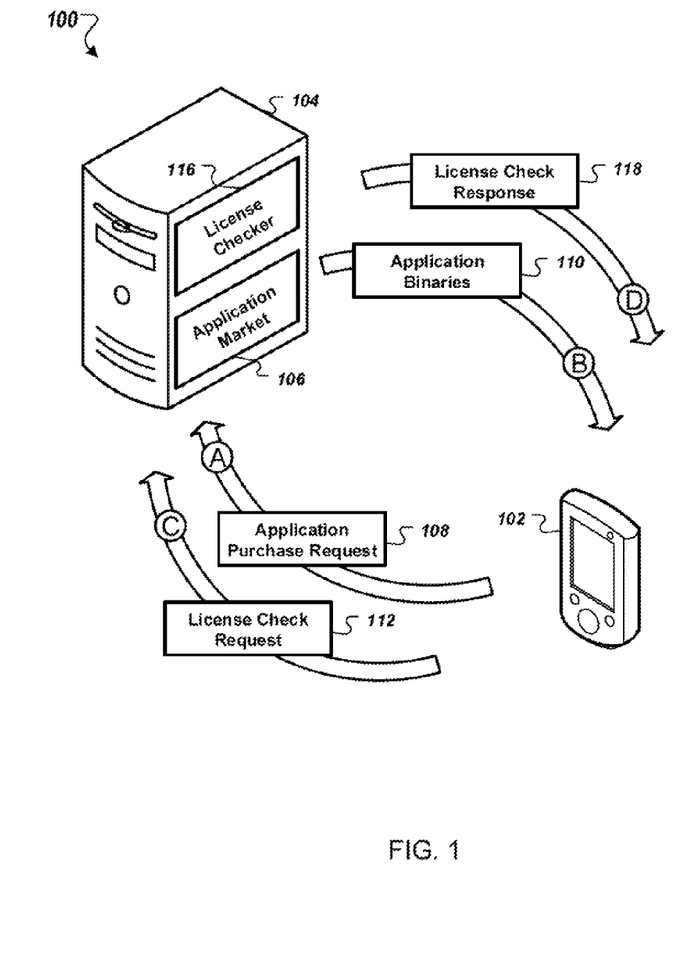
FIG. 1 is a conceptual diagram of a system for distributing software applications and checking the respective license statuses of the applications.

FIG. 1 is a conceptual diagram of a system 100 for distributing software applications and checking the respective license statuses of the applications. In the system, a client device 102 communicates with a server 104 that hosts an application market 106, such as an app store. Such communication may occur over any appropriate network (e.g., Internet, LAN, WAN, wireless broadband, or any combination thereof). Client device 102 is depicted as a smartphone, but other types of client devices (e.g., desktop computers, laptop computers, netbooks, tablets, set-top boxes, and the like) may also communicate with server 104. Similarly, server 104 is depicted as a stand-alone server, but server 104 may represent a cluster of servers, a server farm, or other groupings of servers that are used to host application market 106. In some implementations, server 104 may be operated by a trusted organization that provides the licensing services described here.

Client device 102 may be configured to execute any number of software applications, or apps, that provide the device with various types of functionality. One type of app may be a marketplace client app that provides connectivity to and interaction with the application market 106. The marketplace client app can be associated with the trusted organization, and can be provided by the trusted organization for purposes of accessing the application market 106. Using the marketplace client app, a user of client device 102 may browse the application market 106 or search for specific apps that are published through the application market 106.

In a typical marketplace transaction, a user may identify an interesting app, such as by searching or browsing the application market 106, and may then decide to purchase the app. As shown by arrow A, client device 102 may send an application purchase request 108, e.g., from the marketplace client app executing on the device, to application market 106. The application market 106 may handle the transaction, e.g., by charging the user for the app, and by documenting the purchase, such as by creating an electronic record of the transaction. The electronic record of the transaction may later be used to verify that the user who purchased the application is a licensed user of the application. The application market 106 may then deliver the requested application binaries 110 to the client device 102 as shown by arrow B.

As described above, a user of client device 102 may also be able to obtain the application binaries 110 through illegitimate channels. For example, the application binaries 110 may be copied and/or re-distributed by users who are not authorized by the software publisher to do so. In such circumstances, the software publisher may have some difficulty controlling the unlicensed usage of its apps.

As such, according to the techniques described here, the software publisher may use a license status checking system to determine whether a particular copy of the app is appropriately licensed by the user who is attempting to execute the app. For example, if a user who is attempting to execute the app did not purchase the app through the application market 106, the app may be considered unlicensed for that particular user. The license status checking system may also or alternatively be used to determine whether a particular device is licensed to execute the app. For example, a software publisher may tie an app's license to a particular device such that a user with multiple devices may only be permitted to use the app on the one or more devices on which it was actually licensed. Alternatively, a device may be tied to an account to which it is logged in, and the license may be associated with that account, so that a user can execute an app on multiple devices but other users cannot execute the same app on the devices (unless they are logged in as the first user or their account is also licensed to use the app).

As described in greater detail below, an application that utilizes the license status checking system described here may issue a license check request 112 to server 104 that hosts a license checker service 116, as shown by arrow C. As one example, the application may include instructions that cause a license check request 112 to be issued upon launch of the application. In some implementations, the application itself may not communicate directly with server 104, and may instead communicate with a marketplace client that is also executing on client device 102. The marketplace client may be associated with, and may provide access to, the application market 106. The marketplace client may be configured to send the license check request 112 to the license checker service 116, and to receive any response that is sent back from the license checker service 116. Thus, the marketplace client may serve to facilitate the checking of license status for each of the multiple apps on the device and may be called each time one of the apps is executed or at other appropriate times as determined by each of the respective apps.

The license check request 112 may be communicated to server 104 over any appropriate network (e.g., Internet, LAN, WAN, wireless broadband, or any combination thereof). Server 104 is depicted as hosting both the application market 106 and the license checker service 116, but it should be understood that the functionality of the application market 106 and the license checker service 116 may be hosted on different servers. Furthermore, the functionality of each of the application market 106 and the license checker service 116 may be further segmented and hosted on any appropriate number of different servers, e.g., to distribute network traffic loads across additional network devices.

The license check request 112 may include various types of data that allow the license checker service 116 to determine whether the application is properly licensed to the current user or device that is attempting to execute the application. For example, the license check request 112 may include an application identifier (e.g., a package name) that specifies the particular application that the user is attempting to execute. The license check request 112 may also include a random number, or a nonce, that the application may later use to validate any response it receives from the license checker service 116.

Both of these types of data, and other application-specific information, may be identified or generated by the application itself. However, in some cases, the application may not have sufficient permissions to access other types of data that may be useful in determining whether the application is appropriately licensed to a particular user or device. As such, in some implementations, the application may provide the nonce, the application identifier, and/or any other relevant application-specific information to a marketplace client executing on the client device 102, and the marketplace client may collect additional information about the user and the device to be included in the license check request 112. In some cases, the marketplace client may have greater permissions than the application, and may be able to access additional device- and/or user-specific information. For example, the marketplace client may be able to identify the primary account username of a user of the device, the International Mobile Subscriber Identity (IMSI) associated with the device, and other device- and/or user-specific information.

In some implementations, the application may call the marketplace client, e.g., over a remote inter-process communication (IPC), to initiate the license check, and the marketplace client may gather additional information to be included in the license check request 112. The marketplace client may then send the license check request 112, which may include a combination of information gathered by the application and by the marketplace client, to the license checker service 116 on behalf of the application. In the implementation described above, the network connections and licensing-related APIs may be managed by the marketplace client rather than by the application. In such implementations, the application itself does not need to manage network connections to the licensing server or need to be aware of certain licensing-related APIs, and therefore, the application code may focus more specifically on the particular functionality for which it was designed (thus simplifying development for the publisher and perhaps shrinking the size of the application, which can be relevant when multiple applications are relieved of this burden and the burden is placed instead on a single license checking system).

Upon receipt of the license check request 112, the license checker service 116 may evaluate the request to determine whether the user's identity can be established to a certain level of confidence from the information in the request. In some implementations, the system may use a confidence threshold such that, if the user can be identified with a certain level of confidence (e.g., an eighty percent probability), the license checking may continue as described below, but if the level of confidence is lower than the threshold, the license checking may terminate and/or may provide a programmatic response. Examples of a programmatic response to the threshold confidence level not being reached may include generating an error code or sending a default license status, such as "unlicensed" in the response.

The confidence level may be based on factors that correspond directly or indirectly to the information in the request. For example, a user name associated with the device may be considered a direct factor for identifying the user, while a locational identifier (e.g., the current geographic location of the device determined, for example, by IP address, GPS readings from the device, or cell tower or other access point locations) may be considered an indirect factor. The different user identification factors may be weighted equally or unequally in various implementations. For example, in an example where all factors are weighted equally, with four of five factors suggesting that the user of the application is a particular person, the system may be eighty percent confident that the user is that person. In other examples, different factors may be weighted differently, e.g., according to how correlated the factor is with determining a user's identity.

In some implementations, the request may include a token that is associated with an authenticated user of the client device. For example, information associated with the user may be authenticated, either by the licensing service or by a third-party authentication service, and such authenticity may be represented in the form of a token. The token may be stored on the client device, and may be accessed, e.g., by either the application or by the marketplace client, to be included in a license check request. The inclusion of such a token may be considered a strong direct indicator of user identity, and may consequently be weighted heavily in relation to other direct or indirect indicators. In some implementations, inclusion of such a token may be considered determinative of the user identity.

If the license checker service 116 can determine the identity of the user to a sufficient level of confidence, the user's identity may be checked against the purchase records for the application, and the license checker 116 may return a license check response 118, which the marketplace client may then return to the application over the IPC callback. For example, if the identified user matches a user in a purchase record, then the license checker 116 may return a "licensed" response. If not, an "unlicensed" response may be returned. In some implementations, the license checker service 116 may alternatively or additionally evaluate the request based on device-specific information, and may check the device identity against purchase records to determine whether the application is appropriately licensed to the specific device.

To ensure the integrity of the license check response 118, the response may be signed or encrypted by the license checker service 116 using a private key. The private key may be specific to a publisher account or to the application, and may be part of a public key/private key pair that is issued to or generated by a software publisher. In implementations where the key pair is generated by the publisher, the publisher may upload the private key to the license server to use in signing license check responses.

In some implementations, the trusted organization may generate a licensing key pair for each publisher account, and may expose the public key in the publisher account's profile page. The publisher may then copy the public key and embed it in the application source code, which may then be compiled into the application package. The private key may be retained by the trusted organization, which may then use the private key to sign license responses for applications that are published by the associated publisher account. For example, when a license check request is received, the license checker service 116 may determine which application's license status is being requested, and may identify the private key associated with that particular application for use in signing the license response.

The license checker service 116 may then sign the license check response 118 and send the response back to the client device 102. The signed license responses may then be decrypted by the application using the public key that is included in the application package. The use of a public/private key pair in this manner ensures the integrity of the license status check query procedure by allowing the application to detect whether the license check response 118 has been tampered with or has otherwise been spoofed.

Upon receipt of a valid license check response 118 (e.g., one that has not been spoofed), the application may take any appropriate action based on the content of the response. Such actions may be compiled into a policy that controls how the application reacts when it receives a particular response. For example, if the response indicates that the user is appropriately licensed to use the application, the application may be programmed to continue executing as normal. On the other hand, if the response indicates that the user is not licensed to use the application, the application may perform a different programmed response, such as notifying the user that unauthorized use of the application is prohibited, and providing a link or other mechanism that allows the user to obtain a license. The application may also shut itself down, thereby preventing any further use of the application.

In some cases, the policy may also control how the application reacts when it receives an unverified response, e.g., due to server error, or when the application does not receive a response at all, e.g., if the device is offline. In such instances, the policy may determine an appropriate action based on past license check responses. For example, if the application has issued ten previous license check requests, and has received ten license check responses indicating that the user and/or device is licensed to use the application, the policy may disregard the unverified response or lack of a response as an anomaly, and the application may be permitted to continue executing as normal. Similarly, if the application has received ten license check responses indicating that the user and/or device is not licensed to use the application, the policy may disable further execution of the application.

Other customized constraints may also or alternatively be included in the policy. For example, when a response indicates that the application is not properly licensed, the application may continue executing, but may provide only limited functionality to the unlicensed user, such as by disabling features that are only available to licensed users. The application may thus operate like the free mode of a "freemium" distribution model, with an opportunity for a user to take actions to upgrade to a full-featured premium mode. As another example, the application may allow a certain number of unlicensed uses, e.g., for a user to test whether the application is worth purchasing, before being completely or partially disabled. In other cases, the application may provide a trial period, e.g., seven days, during which all or a portion of the functionality is available for use even though the application is not licensed. These and other types of constraints may be established by the software publisher, who may handle the license status returned in the license check response in whatever manner the publisher deems appropriate.

In some implementations, an operating system executing on the device may alternatively or additionally be configured to receive and react to license check responses sent from the license checker service 116. In such implementations, the operating system may initiate an appropriate action upon receiving a valid license check response 118, similar to the way an application may react as described above. For example, upon receiving a license check response 118 that indicates that the application is not licensed for use on the client device, the operating system may terminate the application.

Figure 2:
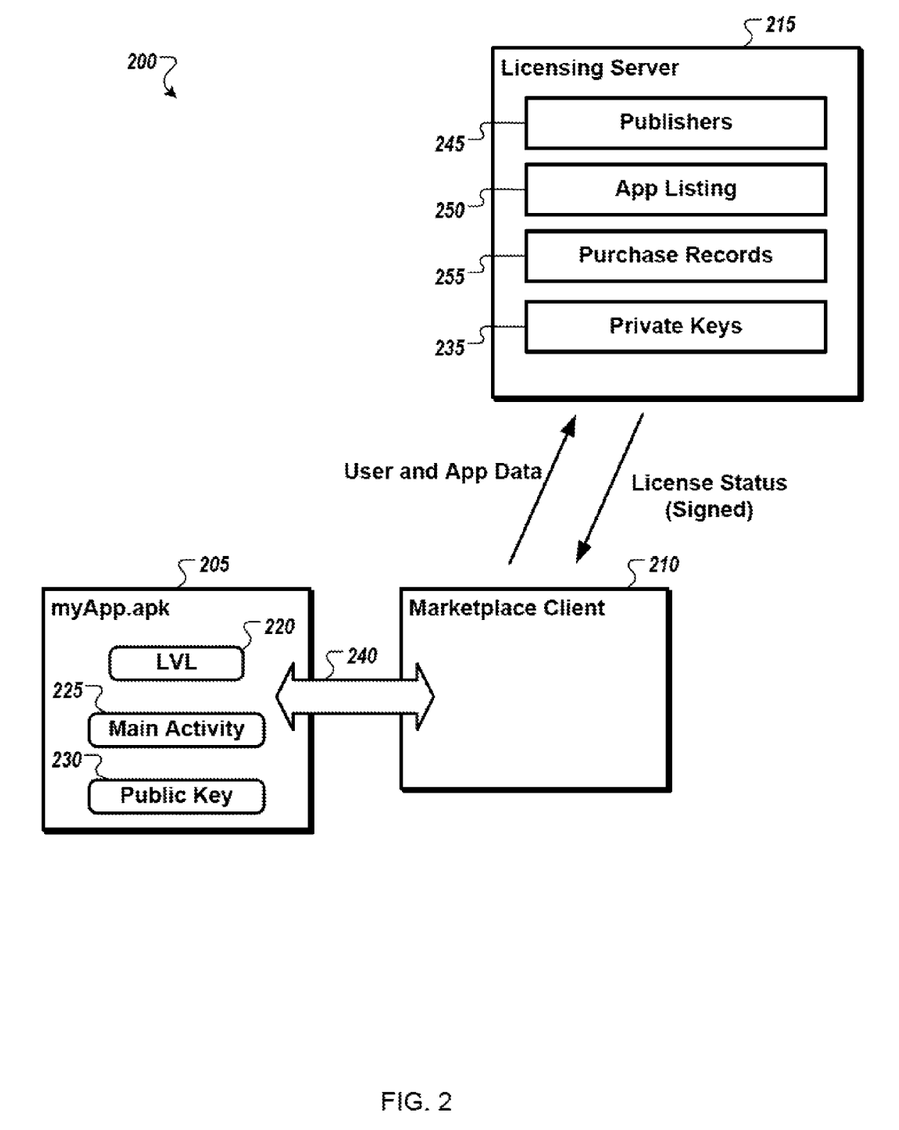
FIG. 2 is a conceptual diagram of a multi-tiered system for checking the license status of a software application.

FIG. 2 is a conceptual diagram of a multi-tiered system 200 for checking the license status of a software application. In system 200, an app named myApp 205 and a marketplace client 210 reside and execute on a client device. Marketplace client 210 may be configured to communicate with a licensing server 215, which executes remotely from the client device, to determine the license status of myApp 205 running on the client device. To check the license status of myApp 205, the application may pass a license check request to marketplace client 210, e.g., over a remote IPC 240, which in turn may query licensing server 215 for the license status of myApp 205.

myApp 205 may be compiled by the software publisher to include a licensing library, e.g., LVL 220, a main activity module 225, and a public key 230. In general, LVL 220 may be used to carry out various license checking techniques as described here, main activity module 225 may include instructions that relate to the primary function of the app, and public key 230 may be used to verify license responses that are received by myApp 205 from licensing server 215. In some implementations, software publishers may perform obfuscation or binary packing of the application, which may make it more difficult for nefarious users to alter or otherwise tamper with the application or the LVL.

The LVL 220 may be developed and maintained by a trusted organization that operates the licensing service, and may be provided to software publishers to simplify the implementation of license checking into their applications. The LVL 220 may include internal classes that handle all or a portion of the functionality performed during a license status query, such as contacting marketplace client 210 to initiate the license status requests, and verifying and validating any responses to the license status requests. The LVL 220 may also expose one or more interfaces that allow software publishers to insert customized code for defining appropriate licensing policies and managing access control to the application based on responses to the license status requests.

In some implementations, the LVL 220 may include an API that facilitates requests for the current license status of the application. Calls to the API may accept one or more parameters. For example, the API call may accept a random number generated by the application, which may be used to validate any returned license responses. The API call may also accept an application identifier parameter, such as the application package name as defined in a manifest from an application market, which may allow the licensing service to identify the application. The API call may also accept an application version code parameter as defined in the manifest. The API may also receive a callback function, which may serve as a delegate function to handle asynchronous responses from the licensing server 215.

Main activity module 225 may include instructions that relate to the primary functionality of the app, and may include one or more calls to the LVL 220. For example, during startup of the app, main activity module 225 may include an early call to LVL 220 to cause a license status request to be executed. Main activity module 225 may also or alternatively include other calls to the LVL 220 for execution of a license status request at specific execution points other than startup. For example, a particular game application may allow unlicensed users to play the first three levels of the game, but may require a license to progress further. In this case, the main activity module 225 may include a call to LVL 220 when the user attempts to access any levels past the first three.

Licensing server 215 may operate as a trusted licensing server to determine whether an application, e.g., myApp 205, is licensed to a user or a device attempting to execute the application. As described above, myApp 205 may include logic to either allow or disallow further use of the application based on the license status response from the licensing server, or may include other logic to handle the response in a manner specified by the publisher of the application. As such, the role of the licensing server 215 may be to provide the license status for the user, but the application itself may be responsible for querying the server and conditionally granting access to the application.

Licensing server 215 may maintain a variety of information related to the licensing techniques described here. For example, licensing server 215 may include information such as publisher data 245 that relates to the various publishers that publish software applications in the application marketplace, app listing data 250 that corresponds to the software applications offered in the application marketplace, and purchase records data 255 that describes the transactions involving applications and other products sold through the application marketplace. The publisher data 245 and app listing data 250 may be used, for example, to link the publisher to the application that is requesting a license check, such that the licensing server 215 can sign the response with the appropriate private key 235.

In some implementations, the licensing server 215 may consider a user to be licensed if the user (e.g., via a registered user account with the system) is recorded to have purchased the application, or if the application is available for free. To properly identify the user and determine the license status, the server may receive information about the application and user from the marketplace client 210 in the form of a license status request. The license status request may additionally or alternatively include information about the device that is attempting to execute the application, such as in implementations where the license is tied to a device rather than to a particular user. Such application-, user-, and/or device-specific information may be gathered by the application, by the marketplace client 210, or by a combination of the two. The information may then be used to identify a particular user or device attempting to execute the application, which may then be compared to the purchase records data 255 to determine whether the application was purchased through the application marketplace by or for the identified user or device.

According to the implementation shown, myApp 205 does not query licensing server 215 directly, but instead calls marketplace client 210 over remote IPC 240 to initiate a license request. In other implementations, the application may include logic, e.g., in the LVL 220, that allows the application to directly query licensing server 215. The license request may include various types of application-specific, user-specific, and/or device-specific information to allow the licensing server 215 to determine the license status of the application. For example, myApp 205 may pass its package name and a nonce in a remote IPC call to the marketplace client 210. myApp 205 may also issue a callback over which the response from the licensing server 215 can be returned asynchronously to myApp 205 from the marketplace client 210.

In some implementations, marketplace client 210 may have greater permissions than does myApp 205, and may therefore collect additional information about the user and/or the device, such as the device's primary account username, IMSI, and other information. Marketplace client 210 may then send the license check request to the licensing server 215 on behalf of myApp 205.

Upon receiving the license check request, licensing server 215 may evaluate the request using any appropriate available information about the user, the device, and the application in an attempt to establish the user's and/or device's identity to a sufficient level of confidence. If the user's and/or device's identity can be established, the licensing server 215 may then check the identity against purchase records 255 for the application and return a license response, which marketplace client 210 may then return to the application over the IPC callback.

To ensure the integrity of the license queries, the licensing server 215 may sign the license response data using a private key 235, which may be part of an RSA key pair that is shared between the server and the application publisher. In some implementations, the licensing service may generate a licensing key pair for each publisher account and may expose the public key in the account's profile page. The publisher may then copy the public key and embed it in the application source code. Upon compiling the source code, the public key 230 is embedded into the application, which can then be published on the application marketplace. The licensing server 215 may retain the private key 235 internally and may use it to sign license responses for applications published on that account.

When the application receives a response that has been signed with a private key 235, it may use the embedded public key 230 to verify the data. The use of public key cryptography in the licensing service may allow the application to detect responses that have been tampered with or that are spoofed.

Figure 3:
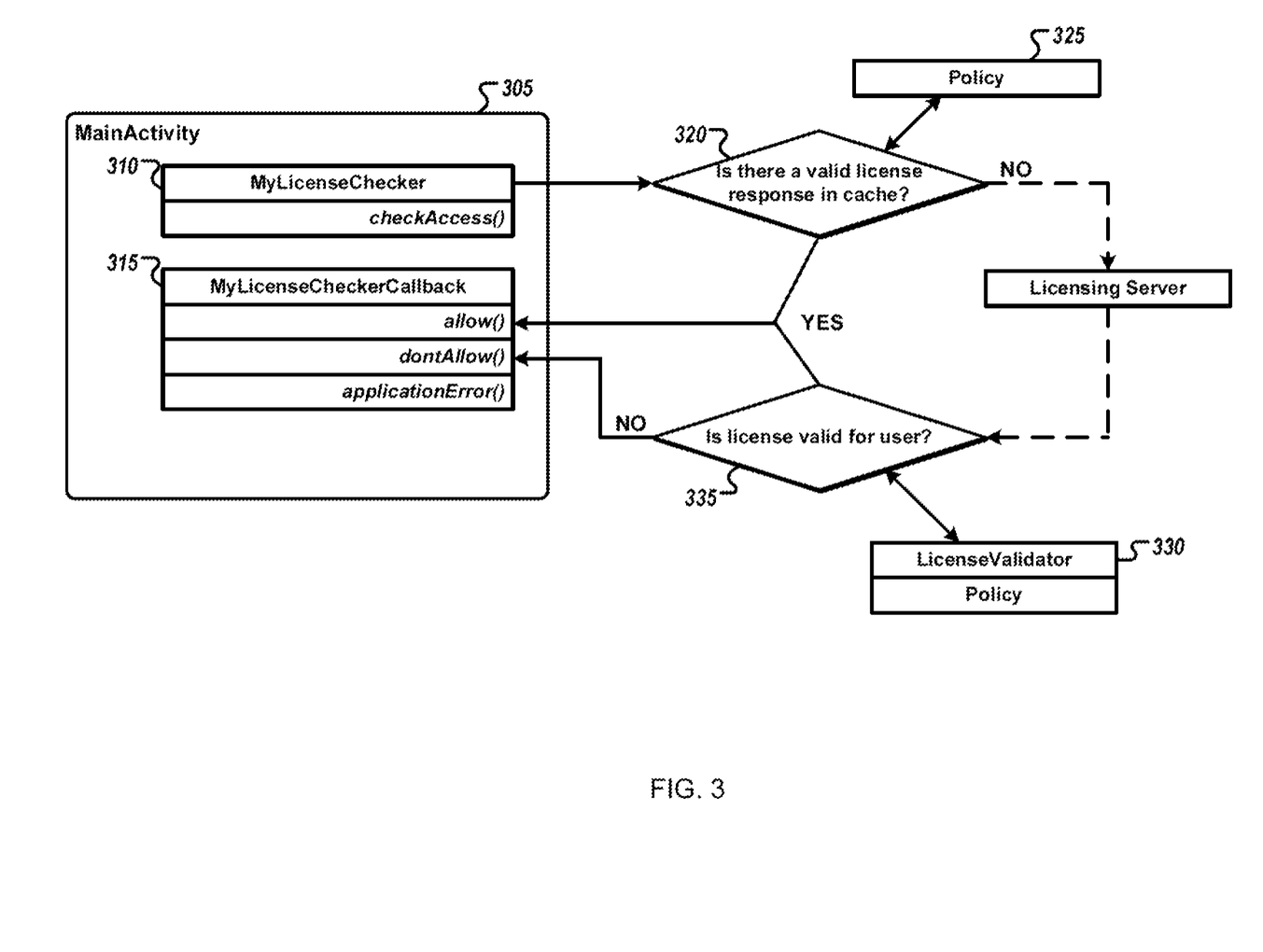
FIG. 3 is a diagram showing an example license check and response.

FIG. 3 is a diagram showing an example license check and response. In previous examples of the license status checking techniques described above, the application queried a licensing server via the marketplace application any time the application wanted to ascertain the license status of the application. As shown in FIG. 3, the application may also use a caching mechanism to improve performance of the licensing system. Such implementations may be used, for example, in situations where it is not possible or convenient to access the licensing server every time the application requests the license status. For example, caching may be used when the device cannot communicate with the licensing server, e.g., because the device does not have network connectivity or because the licensing server is offline. In such examples, the application may still be allowed to function based on cached license status information.

One or more license checks may be added to an application's main activity module 305 as described above with respect to FIG. 2. For example, an application may include a license check in the application's onCreate( ) method, such that when a user launches the application, a license check is invoked. License checks may also be added at other specific execution points. For example, some applications may include multiple activity modules, which other applications may be able to execute. In such cases, a license check may also be included in those activity modules to ensure the application is appropriately licensed even if it was not directly launched by the user.

A license check may utilize two primary interfaces—a license checker interface 310 and a license checker callback interface 315. The license checker interface 310 may include a call to a method to initiate the license check. For example, in the LVL, this may be a call to a checkAccess( ) method of a LicenseChecker object that the application constructs.

The license checker callback interface 315 may include a callback that returns the result of the license check. The interface may declare two methods, allow( ) and dontAllow( ) which may be invoked by the LVL based on the result of the license check. The two methods may be implemented using any appropriate logic to either allow or disallow the user access to the application. An additional applicationError( ) method may also be declared to handle any application errors that are thrown during the license check.

As shown in the diagram, code in the application's main activity module 305 instantiates the license checker 310 and license checker callback 315 objects. When constructing license checker 310, the code may pass parameters including an application context, a policy to be used, and the publisher's public key for licensing.

The code then calls the checkAccess( ) method of the license checker 310. The method may access a policy 325, e.g., to determine whether there is a valid license response cached locally (320). If it does, then the checkAccess( ) method may call the allow( ) method in the license checker callback 315. Otherwise, the license checker 310 may initiate a license check request that is sent to the licensing server.

When a response is received from the licensing server, license checker 310 may create a license validator 330 that may verify the signed license data and extract various information from the response. The information may be passed to the policy for further evaluation to determine if the license is valid for the user (335). If the license is determined to be valid, the policy 325 may cache the response, and may notify the validator 330, which may then call the allow( ) method of the license checker callback 315. If the license is not valid, the policy 325 may notify the validator 330, which may then call the dontAllow( ) method of the license checker callback 315. In some implementations, the license status as either valid or invalid may be encrypted and stored locally on the computing device, e.g., in the cache. In the case of an application error, such as when the application attempts to check the license of an invalid package name, the license checker 310 may pass an error response to the license checker callback's applicationError( ) method.

With the license information having been cached as described above, subsequent calls to checkAccess( ) may access the cached license information rather than contacting the licensing server. In some implementations, cached license data may be utilized in specific situations as defined by policy 325. For example, when the checkAccess( ) method is called, but the computing device lacks connectivity to the licensing server, an error message may returned from the licensing client to the application. In turn, the application may retrieve the cached license status information.

In some implementations, policy 325 may include caching timeout information that precludes stale license status information from being used. For example, policy 325 may wipe cached license status information that has been stored for a specific period of time, e.g., one week. In other implementations, the cached license status information may be retained for longer periods of time, but the policy 325 may disregard cached data that is too stale. The determination of whether cached data is too stale may be dependent upon why the cache data is being accessed. For example, cached data that is being accessed due to a lack of network connectivity may be considered valid for up to a week, while cached data that is being access to improve performance of the system may only be considered valid for up to an hour, or for a particular user session, for example.

Figure 4:
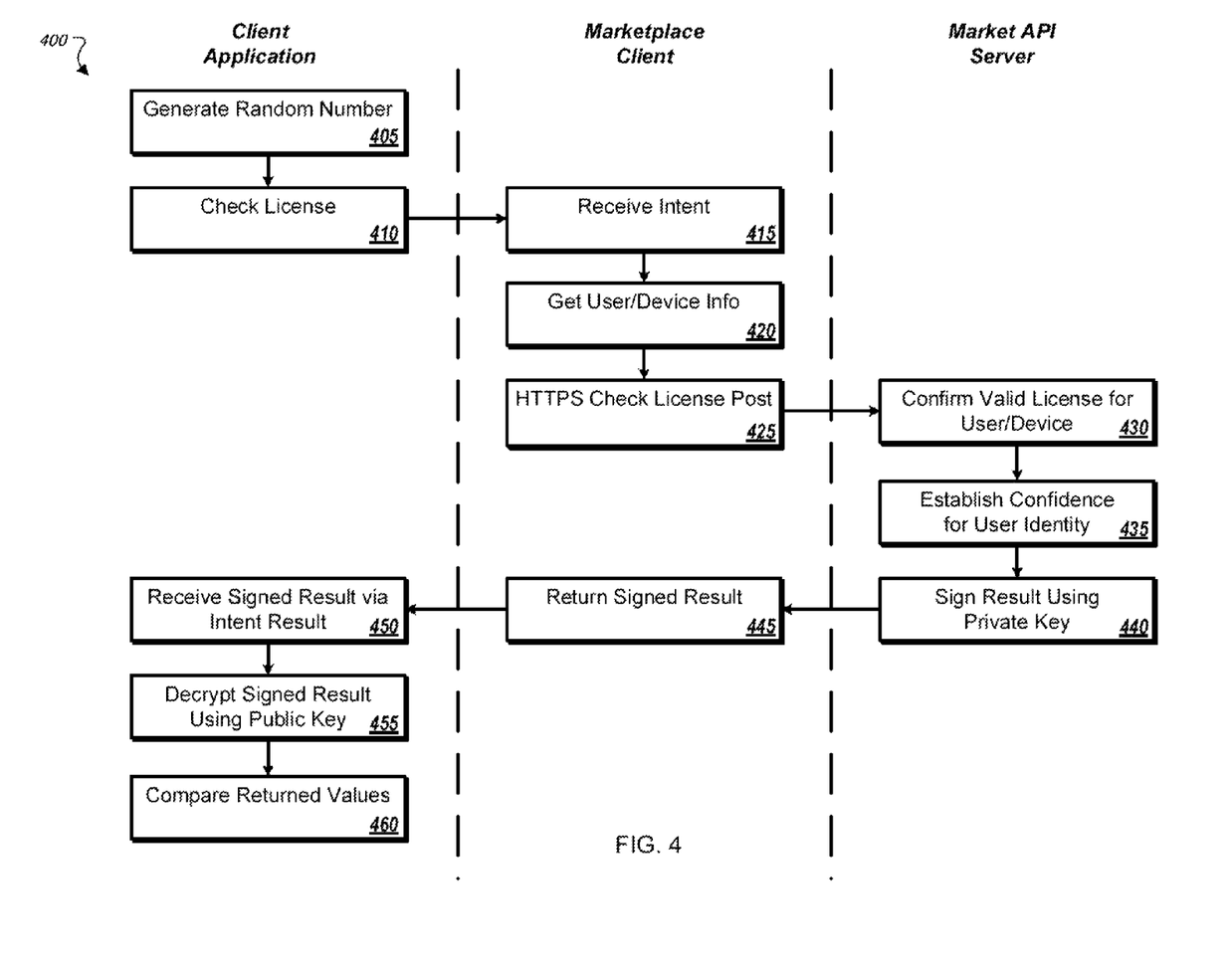
FIG. 4 is a swim-lane diagram of a process for requesting and processing the license status of a software application.

FIG. 4 is a swim-lane diagram of a process 400 for requesting and processing the license status of a software application. Process 400 may be implemented, for example, by the multi-tiered system 200 of FIG. 2. For clarity of presentation, the description that follows uses the multi-tiered system 200 as the basis for describing process 400. However, another system, or combination of systems, may be used to perform the process.

In general, process 400 may be used to verify the license status of an application executing on a client device, and may be called at any appropriate point during execution of the application. The application may generate a secure random number R (405), such as by using JAVA's Secure Random functionality, and may save the value for future reference. The application may then initiate a call to check the license status of the application (410), such as by calling a checkLicense( ) method in a license verification library and passing R and callbackFunction parameters. Additional or alternative application-specific parameters may also be passed in the checkLicense( ) method. The checkLicense( ) method may then call the marketplace client application executing on the client device, e.g., using intent, or a binder, or other appropriate mechanism.

The marketplace client application may receive the intent (415), and may attempt to gather information associated with the user and/or with the device (420). For example, the marketplace client application may identify a central sign-on service username, a phone number (MSISDN), the IMSI, a mobile device identifier, or other appropriate user- or device-specific information. This information may be referred to as identity information. In some implementations, the identity information may not be trusted by the market API server, so the identity of the user or device may still be uncertain. Instead, the information may be considered as signals that the market API server may use when it attempts to determine the identity of the user or the device.

The marketplace client application may send a check license post, e.g., over HTTPS, to the market API server, passing R, application name, and identity information (425). In some implementations, proxy servers may be used to add MSISDN information to unencrypted parts of the transmission, which may provide more user identity signals that may be used by the market API server.

Upon receipt of the check license post, the market API server may record all or portions of the information included in the post, which may later be used to help identify fraudulent user identity information. Over time, numerous irregular signals received by the market API server may be used to identify fraud. For example, the market API server may maintain associations between computing devices on which the client application is executed and identity information associated with users who are executing the application. Market API server may also keep track of the number and identity of the devices on which the user is executing the application. In some implementations, if a particular user identity is associated with a certain number of application executions on different client devices, which may indicate fraud, the user identity may be invalidated as a licensed user for the particular application. Other fraud-prevention mechanisms may also be implemented by market API server, and may be based on the identity information that is received at market API server over time.

The market API server may confirm that the user and/or the device has a valid license to use the application (430), such as by checking to see if the application name is registered to the user associated with the user identity information. The market API server may also establish a level of confidence regarding the user's identity (435). For example, the market API server may analyze the user identity information and the stored data from previously received posts to determine a level of confidence that the user is who he or she claims to be.

If the application is registered to the user in the user identity information, and if the market API server is confident, e.g., to a certain level of probability, that the user is who he or she claims to be, then the market API server may generate a return message of "licensed." Otherwise, the market API server may generate a return message of "not licensed." The return message may then be combined with additional information, including for example, the application name, R, the package name, a system ID associated with the user, and/or a timestamp. The market API server may sign the return message and any additional information using a private key associated with the publisher (440).

The signed data and signature may then be returned to the marketplace client, which in turn may return the signed result to the client application (445). For example, the marketplace client may call the callback function with the signed data and signature passed as parameters to return the signed result back to the client application.

The client application may then receive the signed result via an intent result (450), and may decrypt the signed result using a public key (455). The public key may have been embedded in the client application when the application is compiled, and may be used to verify the integrity of the signed result. The client application may also compare the returned values in the signed data (460). For example, the application may compare the returned R to verify that it matches the random number that was generated at the beginning of the process.

Upon verification that the response is a valid response from market API server, the client application may then decide how to react to the license status result, e.g., based on a policy. For example, the application may provide full functionality if the return message indicates that the application is licensed, and may provide limited or no functionality if the return message indicates that the application is not licensed. In some implementations, the client application may use the information in the signed result along with its own signals to determine an appropriate action based on a policy associated with the application.

FIG. 5 shows tables with example status codes that may be utilized by the license status checking systems and processes described above. Table 500 represents example status codes that may be included in a response from the marketplace client to the client application. The status codes in table 500 all include errors that occurred following an initiation of a license status check by the client application, and are returned unsigned by the marketplace client because the licensing server never received the license status check request. The client application may be configured to handle these or other status codes according to a policy defined by the client application.

Table 550 represents example status codes that may be returned to a client application from the license server in response to a license status check request. Unless otherwise noted, the status codes are signed so that the client application can verify that the response came from the license server. The client application may be configured to handle these or other status codes according to a policy defined by the client application as described above.

Figure 6:
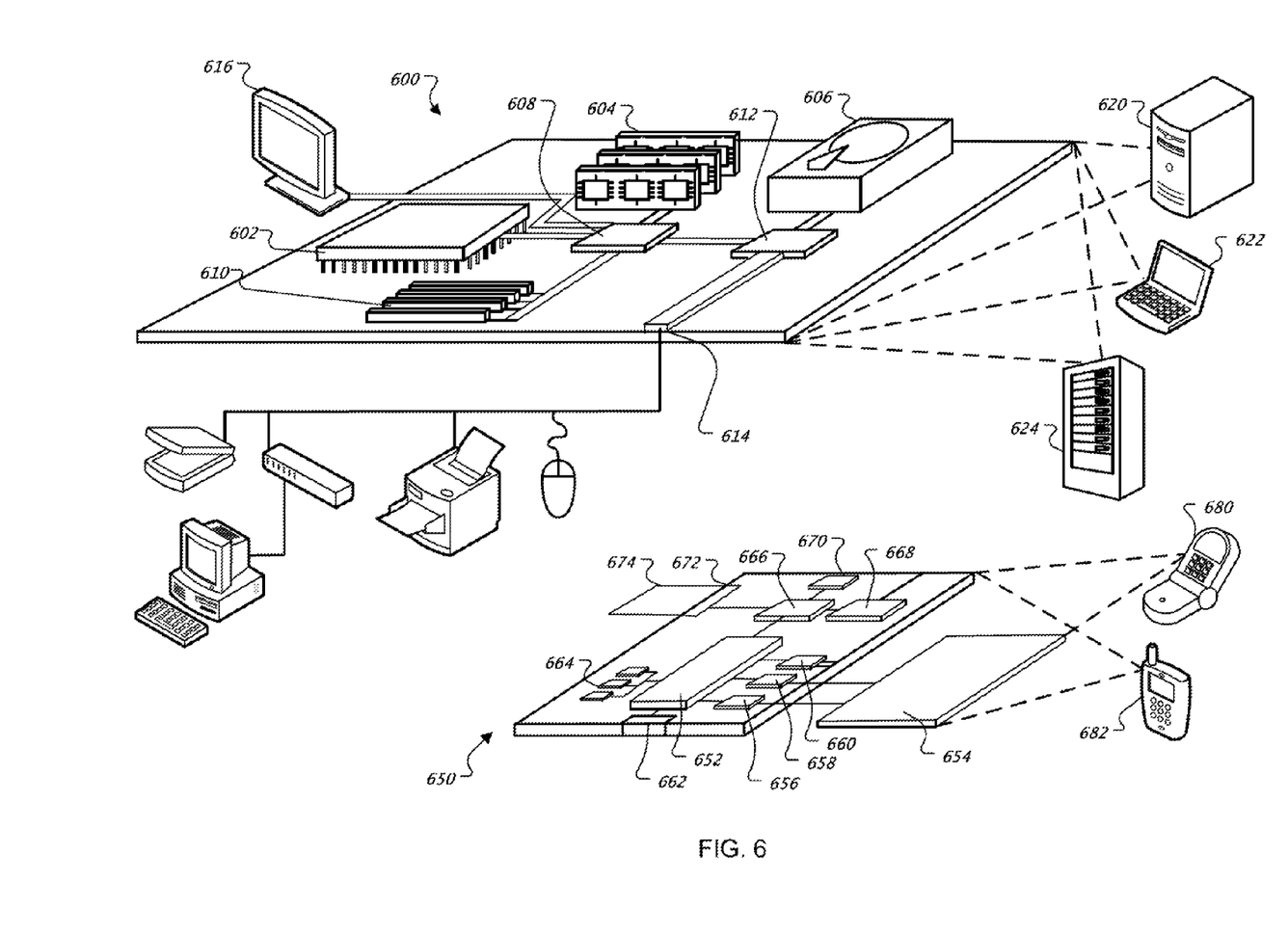
FIG. 6 shows an example of a computer device and a mobile computer device that can be used to implement the techniques described here.

FIG. 6 shows an example of a generic computer device 600 and a generic mobile computer device 650, either of which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple busses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various busses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures may not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for determining a license status of a software application, the method comprising:
    receiving, with a licensing client executing on a client computing device and from a software application that is separate from the licensing client and is for executing on the client computing device, a license status request to obtain an indication of whether the software application is licensed for use on the client computing device, wherein the client computing device includes multiple different software applications in addition to the software application;
    identifying, using the licensing client, identity information that corresponds to at least one of the group consisting of user identity information that corresponds to a user of the client computing device and device identity information that corresponds to the client computing device;
    sending a communication generated from the license status request and the identity information to a licensing service that operates remotely from the client computing device, the communication being used by the licensing service to generate the indication of whether the software application is licensed for use on the client computing device based at least in part on the identity information and licensing information associated with the software application, wherein the licensing client is used to send communications for particular ones of the multiple different software applications when licensing status checks are needed for particular ones of the multiple different software applications;
    receiving, with the licensing client, a license status response from the licensing service that includes the indication of whether the software application is licensed for use on the client computing device; and
    sending the license status response to the software application for processing by the software application,
    wherein the licensing client comprises a marketplace client that provides connectivity to, and interaction with, a web-accessible application market that makes applications available for purchase.

2. The method of claim 1, wherein processing by the software application comprises extracting the indication from the license status response, and disabling at least a portion of the software application when the indication indicates that the software application is not licensed for use on the client computing device.

3. The method of claim 1, wherein the licensing client and the licensing service are operated by an organization that distributes copies of the software application through an application marketplace, and is different from a publisher that publishes the software application.

4. The method of claim 3, wherein the licensing information associated with the software application comprises purchase records that indicate users who have purchased the software application through the application marketplace.

5. The method of claim 1, wherein the license status response is encrypted using a private key that is part of a public-private key pair, and processing by the software application comprises decrypting the license status response using a public key that is part of the public-private key pair.

6. The method of claim 5, wherein the public key is embedded in a compiled binary of the software application.

7. A computer-implemented method for determining a license status of a software application, the method comprising:
    receiving, with a licensing client executing on a client computing device and from a software application executing on the client computing device, a license status request to obtain an indication of whether the software application is licensed for use on the client computing device;
    identifying, using the licensing client, identity information that corresponds to at least one of the group consisting of user identity information that corresponds to a user of the client computing device and device identity information that corresponds to the client computing device, wherein the identity information comprises information that is accessible by the licensing client but is inaccessible by the software application;
    sending a communication generated from the license status request and the identity information to a licensing service that operates remotely from the client computing device, the communication being used by the licensing service to generate the indication of whether the software application is licensed for use on the client computing device based at least in part on the identity information and licensing information associated with the software application;
    receiving, with the licensing client, a license status response from the licensing service that includes the indication of whether the software application is licensed for use on the client computing device; and
    sending the license status response to the software application for processing by the software application,
    wherein the licensing client comprises a marketplace client that provides connectivity to, and interaction with, a web-accessible application market that makes applications available for purchase.

8. The method of claim 1, wherein processing by the software application comprises extracting the indication from the license status response, and storing the indication in storage of the client computing device.

9. The method of claim 8, further comprising receiving, with the licensing client, a second license status request from the software application, determining, using the licensing client, that the licensing service is unavailable to process the second license status request, and sending a message to the software application indicating failure of the second license status request, wherein the software application, upon receiving the message, retrieves the stored indication, and determines whether the software application is licensed for use on the client computing device based on the stored indication.

10. A non-transitory computer-readable storage medium storing instructions that, when executed by one or more processing devices, cause the processing devices to perform operations comprising:
receiving, with a licensing client executing on a client computing device and from a software application that is separate from the licensing client and is for executing on the client computing device, a license status request to obtain an indication of whether the software application is licensed for use on the client computing device, wherein the client computing device includes multiple different software applications in addition to the software application;
identifying, using the licensing client, identity information that corresponds to at least one of the group consisting of user identity information that corresponds to a user of the client computing device and device identity information that corresponds to the client computing device;
sending a communication generated from the license status request and the identity information to a licensing service that operates remotely from the client computing device, the communication being used by the licensing service to generate the indication of whether the software application is licensed for use on the client computing device based at least in part on the identity information and licensing information associated with the software application, wherein the licensing client is used to send communications for particular ones of the multiple different software applications when licensing status checks are needed for particular ones of the multiple different software applications;
receiving, with the licensing client, a license status response from the licensing service that includes the indication of whether the software application is licensed for use on the client computing device; and
sending the license status response to the software application for processing by the software application,
wherein the licensing client comprises a marketplace client that provides connectivity to, and interaction with, a web-accessible application market that makes applications available for purchase.

11. The non-transitory computer-readable storage media of claim 10, wherein processing by the software application comprises extracting the indication from the license status response, and disabling at least a portion of the software application when the indication indicates that the software application is not licensed for use on the client computing device.

12. The non-transitory computer-readable storage media of claim 10, wherein the licensing client and the licensing service are operated by an organization that distributes copies of the software application through an application marketplace, and is different from a publisher that publishes the software application.

13. The non-transitory computer-readable storage media of claim 12, wherein the licensing information associated with the software application comprises purchase records that indicate users who have purchased the software application through the application marketplace.

14. The non-transitory computer-readable storage media of claim 10, wherein the license status response is encrypted using a private key that is part of a public-private key pair, and processing by the software application comprises decrypting the license status response using a public key that is part of the public-private key pair.

15. The non-transitory computer-readable storage media of claim 14, wherein the public key is embedded in a compiled binary of the software application.

16. The non-transitory computer-readable storage media of claim 10, wherein the identity information comprises information that is inaccessible by the software application.

17. The non-transitory computer-readable storage media of claim 10, wherein processing by the software application comprises extracting the indication of whether the software application is licensed for use on the client computing device, and storing the indication in storage of the client computing device.

18. The non-transitory computer-readable storage media of claim 17, wherein the operations further comprise receiving, with the licensing client, a second license status request from the software application, determining, using the licensing client, that the licensing service is unavailable to process the second license status request, and sending a message to the software application indicating failure of the second license status request, wherein the software application, upon receiving the message, retrieves the stored indication, and determines whether the software application is licensed for use on the client computing device based on the stored indication.

19. A computer-implemented method for determining a license status of a software application, the method comprising:
receiving, with a marketplace client executing on a computing device and from a first software application executing on a client computing device, a first license status request to obtain an indication of whether the first software application is licensed for use on the client computing device;
receiving, with the marketplace client executing on the computing device and from a second software application executing on the client computing device, a second license status request to obtain an indication of whether the second software application is licensed for use on the client computing device;
for each of the first license status request and the second license status request, identifying, using the marketplace client, identity information that corresponds to at least user identity information that corresponds to a user of the client computing device or device identity information that corresponds to the client computing device;
sending, from the computing device to licensing service that operates remotely from the computing device:
(a) a communication generated from the first license status request and the identity information for use by the licensing service to generate the indication of whether the first software application is licensed for use on the client computing device based at least in part on the identity information and licensing information associated with the first software application;
(b) a communication generated from the second license status request and the identity information for use by the licensing service to generate the indication of whether the second software application is licensed for use on the client computing device based at least in part on the identity information and licensing information associated with the second software application;
receiving, with the marketplace client executing on the computing device and from the licensing service:
(a) a first license status response that includes the indication of whether the first software application is licensed for use on the client computing device, and (b) a second license status response that includes the indication of whether the second software application is licensed for use on the client computing device;

sending the first license status response to the first software application for processing by the first software application; and sending the second license status response to the second software application for processing by the second software application, wherein the marketplace client provides connectivity to, and interaction with, a web-accessible application market that makes applications available for purchase.

\* \* \* \* \*